July 13, 1965  J. M. NOBLE  3,194,586
TOOL BAR
Filed March 29, 1963  2 Sheets-Sheet 1
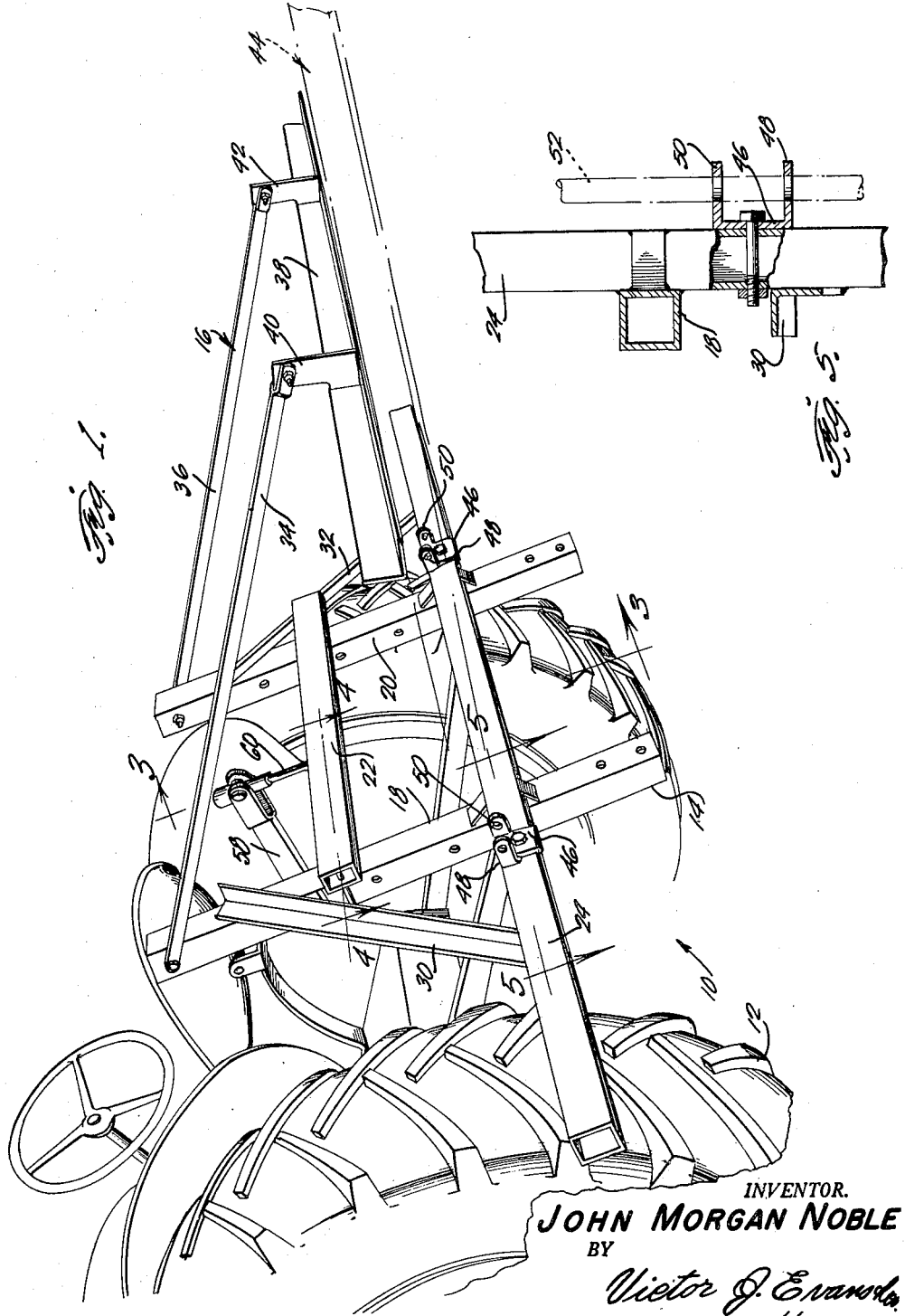
INVENTOR.
JOHN MORGAN NOBLE
BY
*Victor J. Evans*
Attorneys

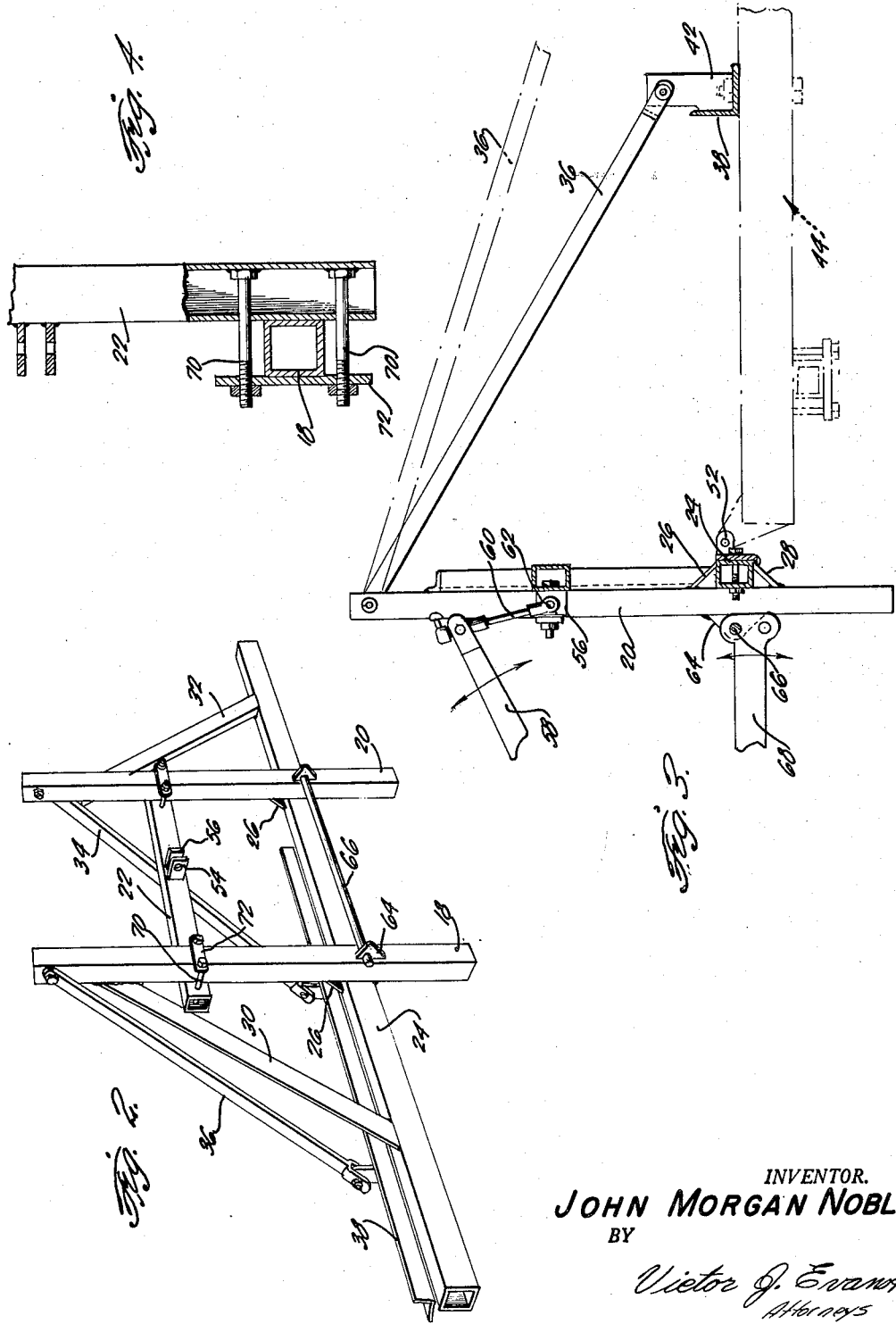

United States Patent Office 3,194,586
Patented July 13, 1965

3,194,586
TOOL BAR
John M. Noble, Rte. 2, Albany, Mo.
Filed Mar. 29, 1963, Ser. No. 269,090
3 Claims. (Cl. 280—461)

The present invention relates to farm equipment generally and in particular to a tool bar for connecting dirt working tools to a tractor or towing vehicle.

An object of the present invention is to provide a universal tool bar for attachment of an implement to a tractor so as to afford full use of the ground working implement regardless of the make of the tractor or of the implement or of the number of connections between the implement and the tractor.

Another object of the present invention is to provide a tool bar which may be applied to a tractor of any make for attaching any ground working implement regardless of make to the tractor and one which provides for means to control the elevation or lateral displacement of the implement relative to the tractor.

A further object of the present invention is to provide a tool bar for a tractor which is simple in structure, one sturdy in construction and having long life characteristics, one which is easily adjustable for any implement and for any tractor to which it is attached, and one which is economically feasible.

These and other objects and advantages of the present invention will be fully apparent from the following description when taken in connection with the annexed drawings, in which:

FIGURE 1 is a perspective view of the portion of a tractor with the tool bar of the present invention shown installed thereon and in an elevated position, FIGURE 2 is a perspective view of the tool bar removed from the tractor, FIGURE 3 is a view taken on the line 3—3 of FIGURE 1, FIGURE 4 is a view on an enlarged scale, taken on the line 4—4 of FIGURE 1, and FIGURE 5 is a view on an enlarged scale, taken on the line 5—5 of FIGURE 1.

Referring in detail to the drawings, in which like numerals indicate like parts throughout the several views the present invention is a universal tractor hitch or tool bar which may be applied to any conventional tractor and used to connect ground working implements constructed to be attached by the three point suspension hitch means provided on most tractors without respect to the manufacture of the tractor or the manufacture of the implement. The tool bar is constructed to be raised and lowered while remaining substantially parallel to the ground surface so that the implement may be moved into and out of ground engaging positions when attached to the tool bar of the present invention.

In FIGURE 1 the reference numeral 10 designates generally a tractor of which there is shown the rear portion having ground engaging wheels 12 and 14.

The tool bar of the present invention is designated generally by the reference numeral 16 and it consists in a pair of laterally spaced upright posts 18 and 20 connected together at a point substantially mid-length thereof by a cross member 22. A horizontally disposed transversely arranged draw bar 24 extends across the posts 18 and 20 inwardly of and adjacent the lower ends of the posts 18 and 20. The draw bar 24 is fixedly secured to the posts 18 and 20 by welding and by braces 26 and 28 as shown most clearly in FIGURE 3.

Other braces 30 and 32 are arranged at an angle with respect to the posts 18 and 20 and extend from the upper end portions of the posts 18 and 20 to the portions of the draw bar 24 exteriorly of the posts 18 and 20 and approximately midway between the attachment of the posts 18 and 20 and the free ends of the draw bar 24.

The present invention provides, as shown most clearly in FIGURE 1, a pair of support arms 34 and 36 pivotally connected by their one ends to the upper ends of the posts 18 and 20, respectively.

A horizontally disposed support bar 38 extends between the other ends of the support arms 34 and 36 and is pivotally connected thereto by means of upstanding standards 40 and 42, respectively.

The support bar 38 is adapted to be secured to a ground working implement the frame of which is shown in dotted lines in FIGURE 3 and designated generally by the reference numeral 44.

The present invention provides coupling means for attachment of the implement 44 to the draw bar 24, such means consisting in a pair of brackets 46 each having ears 48 and 50 through which may be extended a pin, as at 52 in FIGURE 3, for attachment thereto of the forward end of the implement 44.

Another pair of ears 54 and 56 project from the midportion of the cross member 22, as shown in FIGURE 2, the ears 54 and 56 serving as a means for attachment thereto of the free end of the tractor top link 58. A link element 60 connects the free end of the top link 58 with the ears 54 and 56 with a pin 62 extending through the ears 54 and 56 as shown most clearly in FIGURE 3.

The present invention also provides other pairs of ears 64 on the posts 18 and 20 for receiving a pin 66 extending through the free ends of the tractor lift arms 68 as shown most clearly in FIGURE 3.

In a preferred form of the invention, stud bolts 70 have their heads welded to the cross member 22 and a plate 72 is provided for securing the cross member 22 to the posts 18 and 20 as shown in FIGURE 4 with respect to the post 18.

In use, the tool bar of the present invention is readily and with facility secured to the lift arms and top link of a tractor and any ground working implement, such as indicated in dotted lines at 44 in FIGURE 3, is readily and quickly attached to the support bar 38 and to the draw bar 24 by the conventional hitch means associated with such implement 44.

Upon raising of the lift arms of the tractor the draw bar 24 is lifted, as in FIGURE 1, and the support bar 38 is also lifted by the forward tipping movement of the posts 18 and 20 so that the implement 44 is raised from the ground engaging position and may be carried across the highway or along a highway or other area.

While only a preferred form of the invention is shown and described other forms of the invention are contemplated and numerous changes and modifications may be made in the invention without departing from the spirit thereof as set forth in the appended claims.

What is claimed is:

1. A tool bar for attachment to a tractor having a pair of laterally spaced lift arms and a top link disposed above and between said lift arms, said tool bar comprising a pair of laterally spaced posts, a cross member extending between and connecting said posts together, means on said cross member for attachment thereto of the top link of a tractor, a horizontally disposed transversely arranged draw bar fixedly secured to said posts inwardly of and adjacent the lower ends of said posts, coupling means on said draw bar, a ground working implement attached to said coupling means, a horizontally disposed rod fixedly secured to said posts and adapted for securement to the lift arms of said tractor, a support arm having one end pivotally connected to the upper end of each of said posts, and a horizontally disposed support bar extending between and connecting the other ends of said support arms together, said support bar being connected to an implement when the latter is attached to said draw bar.

2. A tool bar for attachment to a tractor having a pair of laterally spaced lift arms and a top link disposed above and between said lift arms, said tool bar comprising a pair of laterally spaced posts, a cross member extending between and connecting said posts together, said cross member being intermediate the ends of said posts, means on said cross member for attachment thereto of the top link of a tractor, a horizontally disposed transversely arranged draw bar fixedly secured to said posts inwardly of and adjacent the lower ends of said posts, coupling means on said draw bar, a ground working implement attached to said coupling means, a horizontally disposed rod fixedly secured to said posts and adapted for securement to the lift arms of said tractor, a support arm having one end pivotally connected to the upper end of each of said posts, and a horizontally disposed support bar extending between and connecting the other ends of said support arms together, said support bar being connected to an implement when the latter is attached to said draw bar.

3. A tool bar for attachment to a tractor having a pair of laterally spaced lift arms and a top link disposed above and between said lift arms, said tool bar comprising a pair of laterally spaced posts, a cross member extending between and connecting said posts together, said cross member being intermediate the ends of said posts, means on said cross member for attachment thereto of the top link of a tractor, a horizontally disposed transversely arranged draw bar fixedly secured to said posts inwardly of and adjacent the lower ends of said posts, coupling means on said draw bar, a ground working implement attached to said coupling means, a horizontally disposed rod fixedly secured to said posts on the sides of said posts opposite to said coupling means and adapted for securement to the lift arms of said tractor, a support arm having one end pivotally connected to the upper end of each of said posts, and a horizontally disposed support bar extending between and connecting the other ends of said support arms together, said support bar being connected to an implement when the latter is attached to said draw bar.

References Cited by the Examiner

UNITED STATES PATENTS

| 2,562,486 | 7/51 | Denning | 172—448 X |
| 2,662,783 | 12/53 | Sawyer | 280—461 |
| 2,755,722 | 7/56 | Fraga | 172—446 X |
| 3,001,590 | 9/61 | Tsuchiya | 172—446 X |

FOREIGN PATENTS

| 151,177 | 4/53 | Australia. |
| 589,041 | 6/47 | Great Britain. |
| 854,759 | 11/60 | Great Britain. |

A. HARRY LEVY, *Primary Examiner.*

KENNETH H. BETTS, *Examiner.*